United States Patent [19]
Jackson et al.

[11] Patent Number: 4,914,783
[45] Date of Patent: Apr. 10, 1990

[54] SLIDING HINGE WITH LOCKING

[75] Inventors: Frank T. Jackson, Corona; Bernard W. Henrichs, Villa Park, both of Calif.

[73] Assignee: The Hartwell Corporation, Placentia, Calif.

[21] Appl. No.: 279,495

[22] Filed: Dec. 5, 1988

[51] Int. Cl.$^4$ ............................................. E05D 15/00
[52] U.S. Cl. ........................................ 16/363; 16/376; 312/323
[58] Field of Search ................. 16/363, 364, 376, 361; 312/323

[56] References Cited

U.S. PATENT DOCUMENTS

| | | | |
|---|---|---|---|
| 1,898,161 | 2/1933 | Arnold | 16/361 |
| 2,630,364 | 3/1953 | Gleason | 312/323 |
| 3,311,945 | 4/1967 | Kluge | 16/361 |

Primary Examiner—Nicholas P. Godici
Assistant Examiner—Carmine Cuda
Attorney, Agent, or Firm—Harris, Kern, Wallen & Tinsley

[57] ABSTRACT

A sliding hinge for mounting a nose cone or cover on a nacelle or housing, such as an equipment package suspended from the wing of an aircraft. Typically two hinges are used, positioned at opposite sides of the housing, for pivoting the nose cone upward to provide access to the equipment within the housing. Each hinge includes a sleeve mounted in the housing, a slide block sliding in the sleeve, and a slide arm pivotally attached to the slide block and mounted in the nose. To open the package, the nose is initially slid forward from the housing and then pivoted to an upward position. During this operation the slide arm slides out of the sleeve from a retracted position to an extended position and then pivots upward to the open position, with the slide block remaining in the sleeve. A locking mechanism is provided for locking the slide block in the sleeve in the extended position so that the nose cover has to be pivoted downward to the horizontal position in alignment with the housing before the arm and nose can be moved toward the housing to the retracted position.

12 Claims, 4 Drawing Sheets

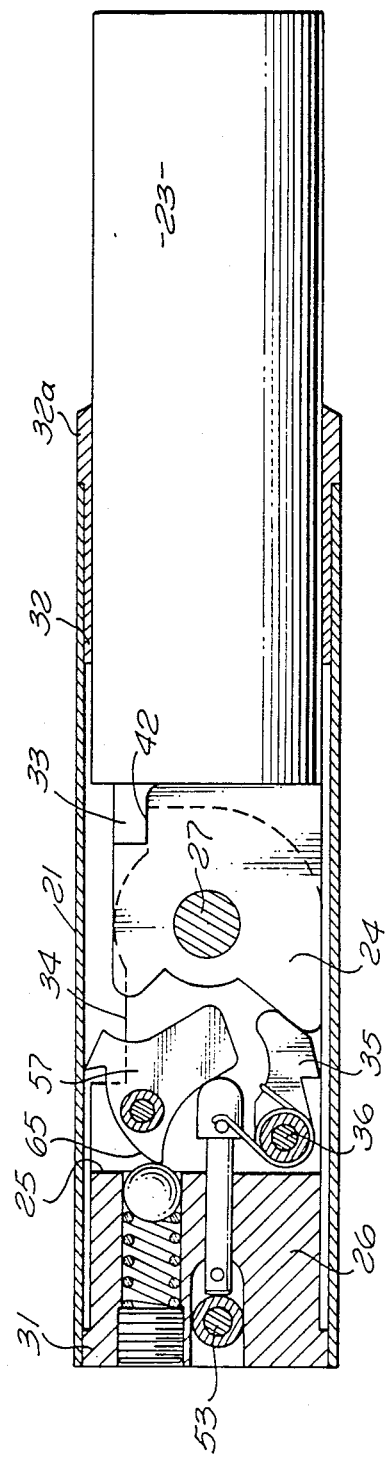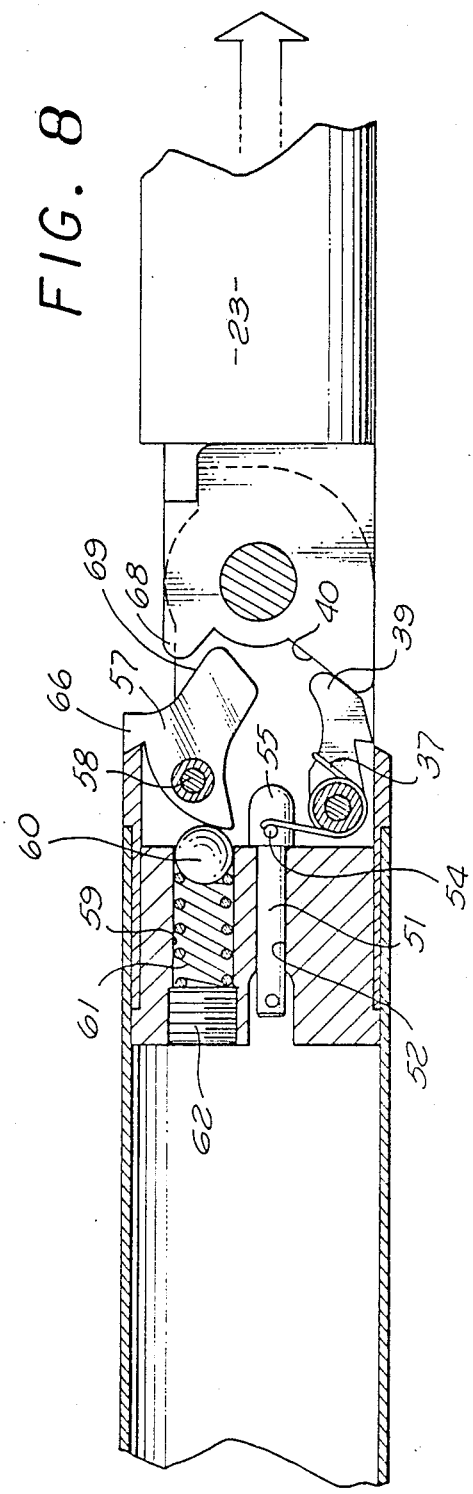

SLIDING HINGE WITH LOCKING

BACKGROUND OF THE INVENTION

This invention relates to hinges, and in particular to a sliding hinge which permits a cover to be moved away from an opening in a housing by sliding action, and then pivot away from the opening to provide access through the opening. The invention is described herein as applied to a nose cone for an equipment nacelle or housing of the type carried on an aircraft wing, but can be utilized in other installations where this type of opening and closing action is desired.

In the past, in one type of installation the nose cone is mounted to the housing by a plurality of individual screws or quarter-turn fasteners, with the nose cone being separated from the housing and placed to one side during work on the equipment. In another type of installation, a nose cone has been attached by means of a goose neck bracket and hinge which permits pivoting of the nose cone away from the housing. With this construction, the goose neck hinge requires a considerable amount of space within the housing, while not providing for a sliding motion of the cover away from the housing.

A variety of pull and tilt arrangements have been utilized for drawers and trays but none of those investigated have proved suitable for the generally rounded nacelle and nose cone environment.

Accordingly, it is an object of the present invention to provide a new and improved sliding hinge which provides for positioning a nose cone or cover on a housing and for sliding of the cover away from the housing, followed by pivoting of the cover away from the housing to provide access to the interior of the housing. A further object is to provide such a hinge which automatically locks in the slide-out position when the cover is pivoted to the side, and which automatically releases the lock when the cover is pivoted to the aligned position. An additional object of the invention is to provide such a hinge arrangement which is really operated by one hand both for removing the cover and for replacing the cover.

Other objects, advantages, features, and results will more fully appear in the course of the following description.

SUMMARY OF THE INVENTION

A sliding hinge for joining two members and including a slide block for sliding engagement with one of the members, typically a sleeve attached to the member, and a slide arm for attachment to the other of the members, with the block and arm pivoted together for motion between a closed position and an open position. In operation, the members are pulled apart and then one is pivoted relative to the other. A stop mechanism automatically prevents the sliding of one member toward the other when they are in the tilted or open position. When the members are pivoted back to the aligned position, the stop is automatically released by camming action which permits sliding or pushing of the members to the closed position.

BRIEF DESCRIPTION OF THE DRAWINGS

FIG. 7 is a view similar to that of FIG. 2 showing an alternative and presently preferred embodiment of the invention;

FIG. 8 is a view similar to that of FIG. 7 with the hinge in an intermediate extended position;

DESCRIPTION OF THE PREFERRED EMBODIMENTS

Figure 1:
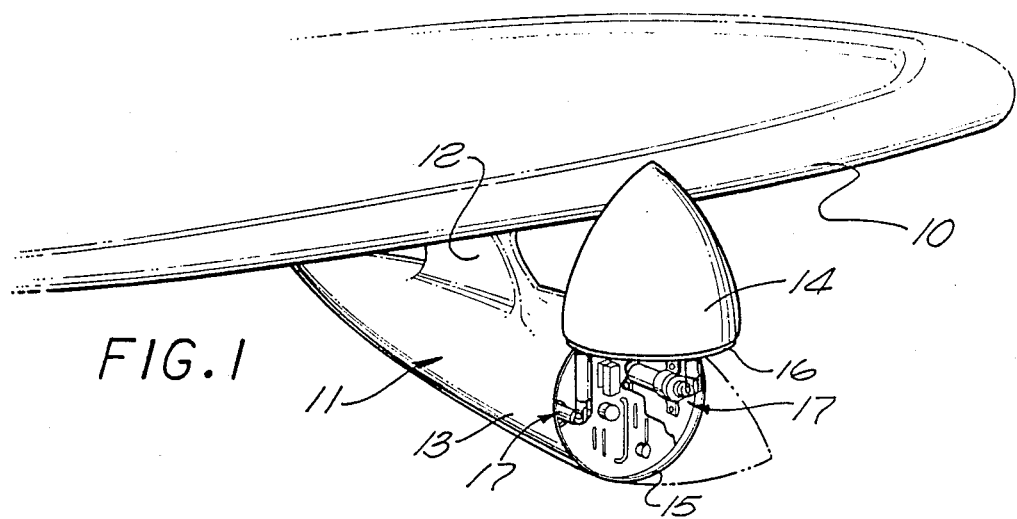
FIG. 1 is a perspective view of an aircraft wing with an equipment housing, with the nose cone in the open position, and incorporating one embodiment of the invention.
Figure 4:
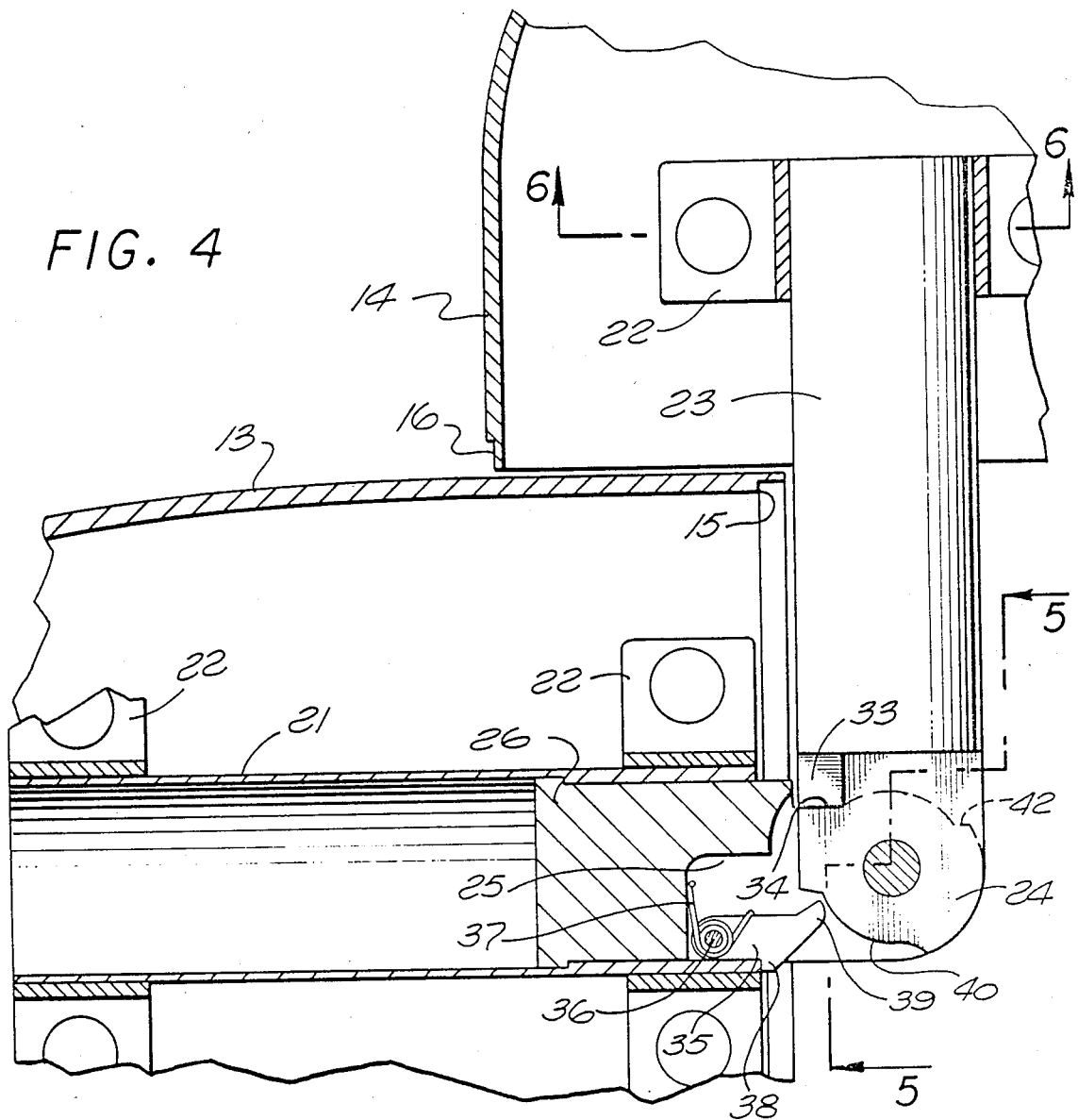
FIG. 4 is a view similar to that of FIGS. 2 and 3, with the nose cone pivoted away from the housing to the open position.
Figure 5:
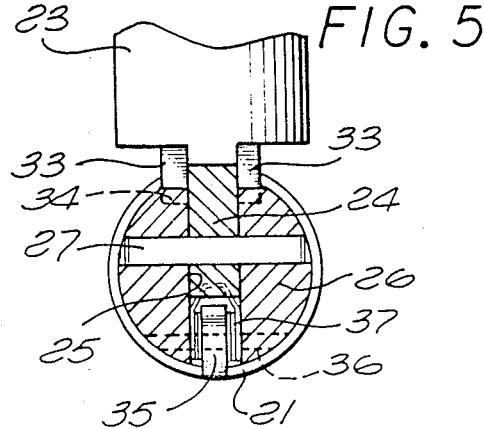
FIG. 5 is a partial sectional view taken along the line 5—5 of FIG. 4.
Figure 6:
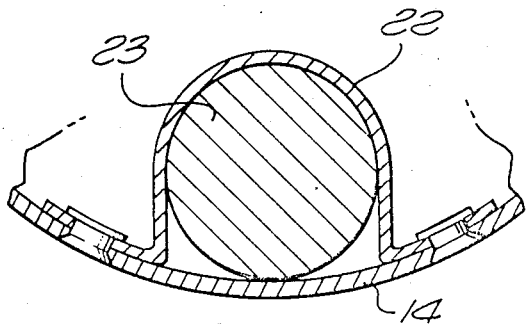
FIG. 6 is a partial sectional view taken along the line 6—6 of FIG. 4.

In FIG. 1, an aircraft wing 10 is shown with an equipment nacelle or housing 11 suspended from the wing by a strut 12. The housing 11 has a body 13 and a nose or cover 14, typically of rounded or circular cross section and generally conical. The nose is shown in the open position in solid lines and in the closed position in phantom lines. The body 13 has an inner shoulder 15 which mates with a rim 16 of the cover 14, as best seen in FIG. 4, to provide a smooth outer surface at the junction between the body and cover.

The nose cone is attached to the body by two hinges 17, which hinges are shown in greater detail in FIGS. 2-6. Typically the hinges are affixed to the interior of the body and of the cover at the widest portions of the respective components. In this configuration, a worker standing on a ladder or a platform for working on equipment within the housing can raise the nose from the closed position to the open position with one hand, and can lower the nose to the closed position with one hand when the work is completed. This is a significant advantage with present day aircraft, where the wing is at a substantial height above the ground, and work is often carried out using a portable step ladder.

In the preferred embodiment illustrated, a sleeve 21 is attached to the body by mounting straps 22 which typically are affixed to the body by rivets. A slide arm 23 is similarly attached to the nose 14 by another mounting strap 22. A tongue 24 of the slide arm 23 is pivotally mounted in a slot 25 of a slide block 26 by a pin 27.

Figure 2:
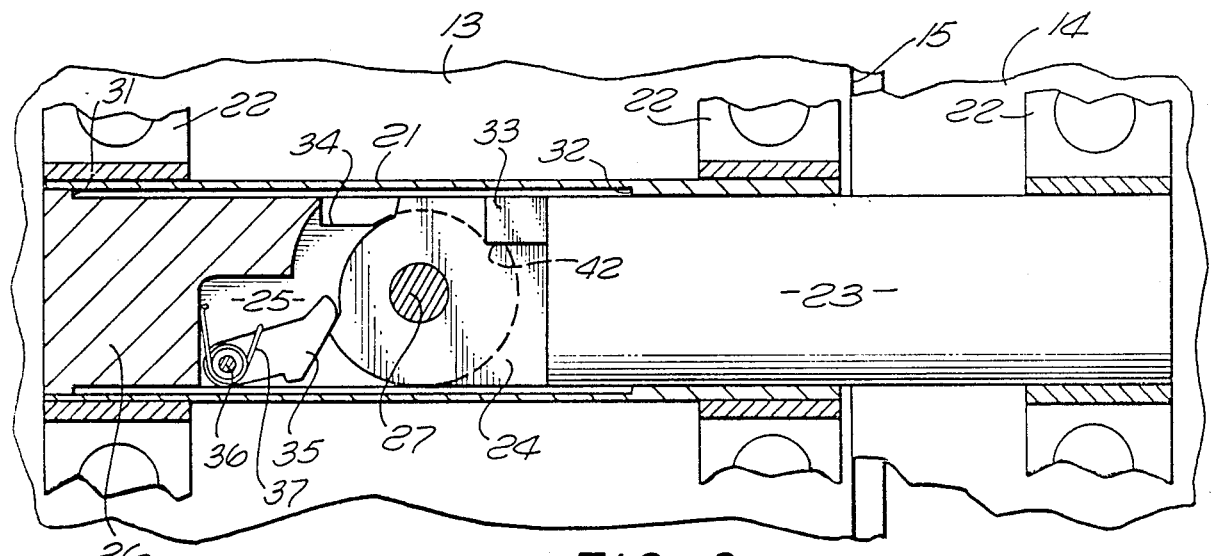
FIG. 2 is an enlarged partial sectional view of the sliding hinge of FIG. 1, with the nose cone in the closed position.
Figure 3:
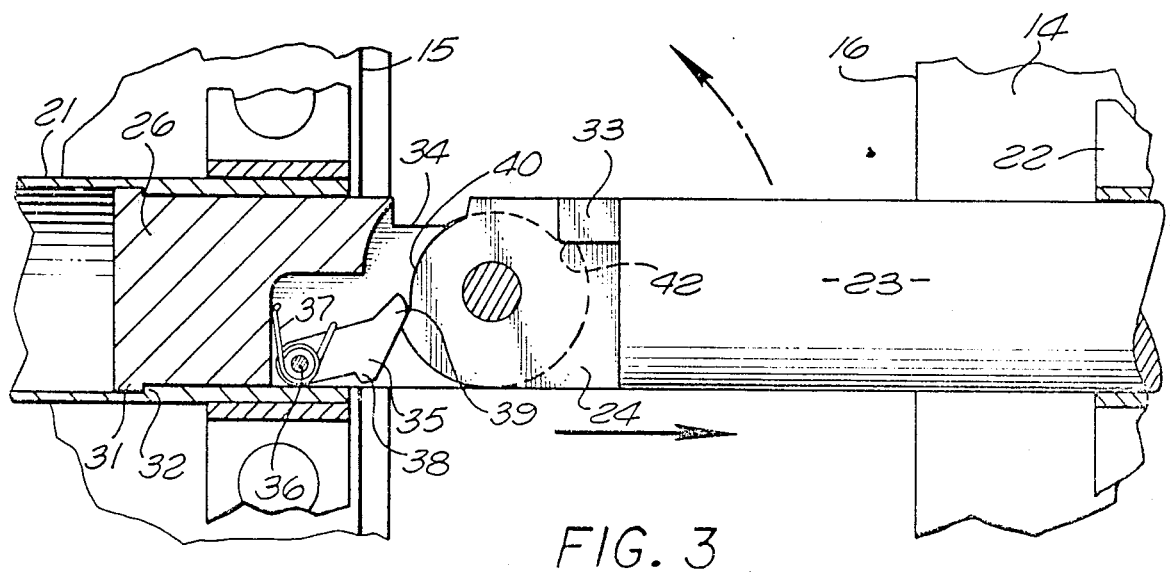
FIG. 3 is a view similar to that of FIG. 2 with the nose cone pulled away from the housing and with the hinge in an intermediate extended position.

Starting with the hinges in the retracted position and the nose in the closed position of FIG. 2, the nose cone 14 is pulled away from the body 13 with the block 26 sliding to the right in the sleeve 21 to an extended position, as shown in FIG. 3. This sliding motion is stopped by engagement of a shoulder 31 of the slide block with a shoulder 32 of the sleeve. Next the nose cone is pivoted, upward in the embodiment illustrated, from the position of FIG. 3 to the position of FIG. 4. Stops 33 on the slide arm 23 engage corresponding notches 34 to provide a limit for the pivoting action. The nose cone may be maintained in the open position by a separate conventional strut, not shown.

A cam 35 is mounted in the slot 25 of the slide block 26 by a pin 36. A spring 37 is positioned around the pin 36 and engages the cam and slide block for urging the cam clockwise as viewed in FIGS. 2-4.

When in the condition of FIG. 4, a shoulder 38 of the cam engages the outer end of the sleeve 21 and prevents inward sliding motion of the slide block, that is, motion to the left as viewed in FIGS. 2-4.

When the worker wishes to close the housing, the nose is pivoted downward from the position of FIG. 4 to the position of FIG. 3. During this pivoting action, an end 39 of the cam 35 is engaged by a cam surface 40 on the tongue 24 and when the arm 23 reaches the aligned position of FIG. 3, the cam 39 has been pivoted counter clockwise, raising the cam shoulder 38 out of engagement with the end of the sleeve 21. The stops 33 now engage with shoulder 42 of the slide block 26 to achieve the alignment of the slide arm 23 and slide block 26.

Next the nose cone is pushed into position on the body, with the slide block 26 and slide arm 23 sliding into the sleeve 21, to the retracted position of FIG. 2. The nose cone may be maintained in the closed position by conventional latches, not shown.

An alternative and presently preferred embodiment of the sliding hinge is shown in FIG. 7-11, where components corresponding to those of FIGS. 2-6 are identified by the same reference numbers.

A plunger 51 slides in a passage 52 in the slide block 26. A pin or rivet 53 is positioned transversely in the sleeve 21 and engages one end of the plunger 52 when the hinge is in the closed position as shown in FIG. 7. The spring 37 has one end engaging the cam 35 and the other end engaging a pin 54 in the head 55 of the plunger. Thus the spring urges the cam 35 clockwise and urges the plunger 51 to the left, as viewed in the drawing figures.

A second cam 57 is mounted in the slot 25 of the slide block 26 by a pin 58. A detent mechanism is also provided in the slide block 26 in a detent passage 59, and includes a ball 60, a spring 61, and a set screw 62 which closes the left end of the passage 59.

The hinge mechanism is shown in the retracted position and the nose in the closed position in FIG. 7. In operation, the nose cone is pulled away from the body with the block 26 sliding to the right in the sleeve 21 as shown in FIG. 8, with the sliding motion stopped by the engagement of the shoulder 31 with the shoulder 32. In the embodiment of FIGS. 2-6, the shoulder 32 is formed integrally with the sleeve 21. In the embodiment of FIGS. 7-11, the shoulder 32 is an extension of an end cap 32a fitted at the end of the sleeve 21.

Also, the cam 57 is pivoted counter clockwise by the spring 59 and ball 60 engaging the surface 65 of the cam 57 bringing the end 66 of the cam 57 into locking engagement with the end 32a of the sleeve 21. This locks the slide arm 23 in the extended position of FIG. 8.

Figure 9:
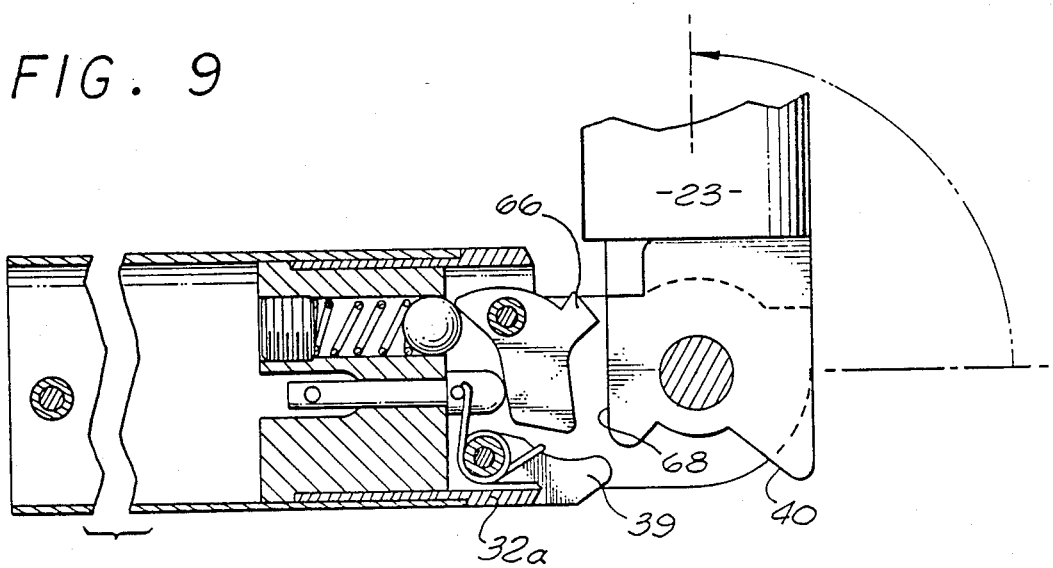
FIG. 9 is a view similar to that of FIG. 7 and 8 with a nose cone pivoted to the open position.

Next the nose cone is raised, moving the arm 23 from the position of FIG. 8 to the position of FIG. 9. During this motion, the surface 40 of the tongue 24 is moved away from the end 39 of the cam 35, and the spring 37 moves the cam 35 clockwise into locking engagement with the end 32a, as shown in FIG. 9. At the same time, a nose 68 of the tongue 24 engages a surface 69 of the cam 57, rotating the cam 57 clockwise and over center past the detent ball and out of engagement with the end 32a, to the unlocking position shown in FIG. 9.

Figure 10:
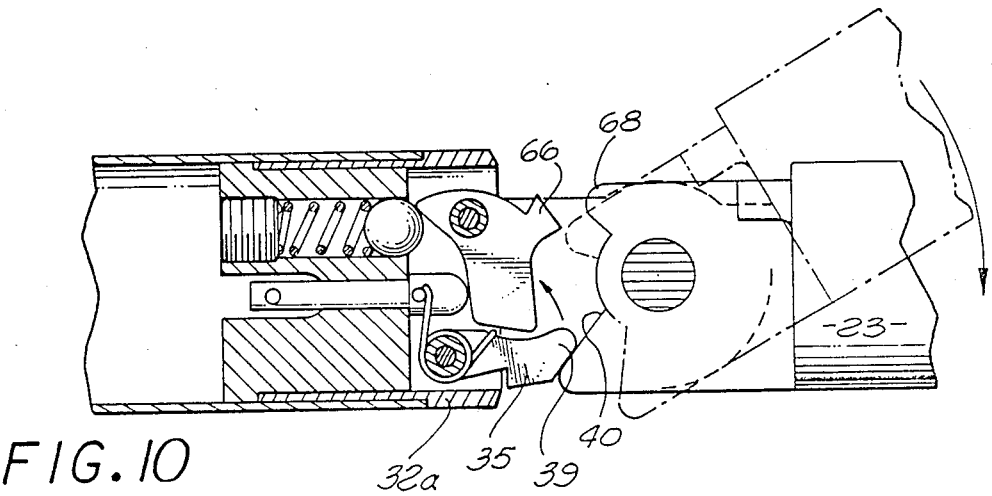
FIG. 10 is a view similar to that of FIG. 9 with the nose cone pivoted from the open position to the intermediate position.

After completion of the work, the nose cone is lowered, moving the hinge toward the aligned position of FIG. 10. The end 39 of the cam 35 is engaged by the surface 40 of the tongue 24 moving the cam 35 counter clockwise and out of engagement with the end 32a. The hinge may now be slid to the retracted position of FIG. 11.

Figure 11:
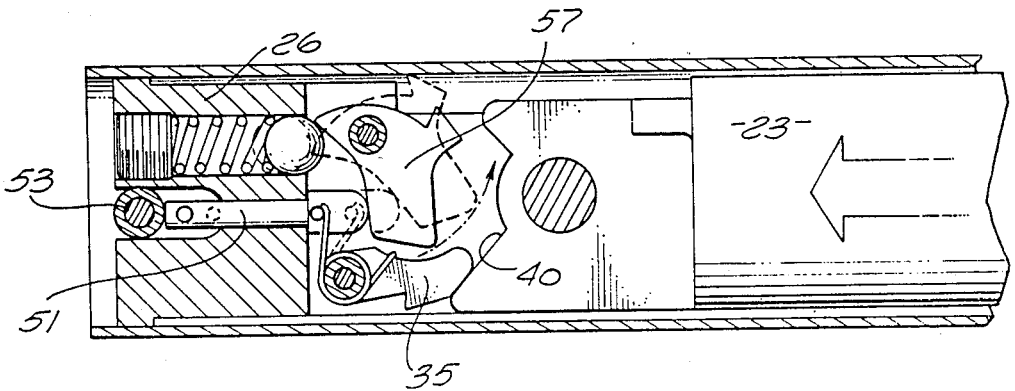
FIG. 11 is a view showing the hinge with the nose cone returned to the closed position.

As the slide block 26 moves to the left, the left end of the plunger 51 engages the pin 53 and moves the plunger in the block 26 to the right to the dashed line position of FIG. 11. The head 55 of the plunger is in engagement with the cam 57, and the translating movement of the plunger causes the cam to pivot counter clockwise over center past the detent ball from the solid line position to the dashed line position. The hinge is now returned to the condition shown in FIG. 7.

Thus it is seen that the objectives of the invention are achieved. A cover or nose cone for a rounded body can be removed and positioned to one side providing clear access to the interior of the body, while maintaining a connection between the cover and body. The movement from the closed position to the open position can be accomplished by the worker with one hand, and any inadvertent inward movement of the slide components with the cover in the open position is blocked by the locking mechanism. However when desired, the cover is readily replaced in the closed position. This operation is achieved with the sliding hinges that can be placed at any location, particularly around the inner edges of the components, so that a minimum amount of interior space is required for the hinges.

We claim:

1. In a sliding hinge for joining two members, the combination of:
   a slide block for sliding engagement with one of said members;
   a slide arm for attachment to the other of said members;
   said block and arm including interengaging pivot means, for pivoting of said arm relative to said block between an extended position and an open position; and
   a first locking means carried on one of said arm and block and engageable with said one member for limiting sliding of said block when said block and arm are in said open position,
   said block and arm including first interengaging cam means for releasing said first locking means when said arm is pivoted to said extended position, said first locking means includes:
   a first cam pivotally mounted on said block and having a first shoulder engageable with said one member when said arm is in said open position; and
   first spring means engaging said block and first cam for urging said first cam shoulder into engagement with said one member;
   with said arm having a first cam surface engageable with said first cam as said arm pivots from said open position to said extended position for moving said first cam shoulder out of engagement with said one member, said first cam and first cam surface forming said first interengaging cam means.

2. A sliding hinge as defined in claim 1 wherein said first locking means limits sliding of said block toward said one member, and including first stop means for limiting sliding of said block away from said one member.

3. A sliding hinge as defined in claim 2 including second interengaging stop means on said block and arm for defining said open position, and third interengaging stop means on said block and arm for defining said extended position.

4. In a sliding hinge for joining two members, the combination of:
- a slide block for sliding engagement with one of said members;
- a slide arm for attachment to the other of said members;
- said block and arm including interengaging pivot means for pivoting of said arm relative to said block between an extended position and an open position; and
- a first locking means carried on one of said arm and block and engageable with said one member for limiting sliding of said block when said block and arm are in said open position,
- said block and arm including first interengaging cam means for releasing said first locking means when said arm is pivoted to said extended position, wherein said block is slideable relative to said one member between a retracted position and said extended position, and including
- a second locking means carried on one of said arm and block and engageable with said one member for limiting sliding of said block when said block is in said extended position,
- said block and arm including second interengaging cam means for releasing said second locking means when said arm is pivoted to said open position.

5. A sliding hinge as defined in claim 4 wherein said second locking means includes:
- a second cam pivotally mounted on said block and having a second shoulder engageable with said one member when said block is in said extended position; and
- second spring means engaging said block and said second cam for urging said second cam shoulder into engagement with said one member;
- with said arm having a second cam surface engageable with said second cam as said arm pivots from said extended position to said open position for moving said second cam shoulder out of engagement with said one member, said second cam and second cam surface forming said second interengaging cam means.

6. A sliding hinge as defined in claim 5 wherein said second spring means includes a detent carried in said block in engagement with said second cam to provide an over center action for said second cam pivoting between locking and unlocking positions.

7. A sliding hinge as defined in claim 6 including a plunger slidingly mounted in said block for engaging said second cam as said block moves towards said retracted position for pivoting said second cam past said detent from said unlocking position to said locking position.

8. A sliding hinge as defined in claim 7 with said second spring means engaging said plunger for urging said plunger away from said second cam, and
including a plunger stop for limiting such movement from said plunger away from said second cam.

9. In a sliding hinge for joining two members, the combination of:
- a sleeve for attachment to one of said members;
- a slide block for sliding in said sleeve;
- a slide arm for attachment to the other of said members;
- said block and arm including interengaging pivot means for pivoting of said arm relative to said block between an extended position and an open position; and
- first locking means carried on one of said block and arm and engageable with said sleeve for limiting sliding of said block when said block and arm are in said open position,
- said block and arm including first interengaging cam means for releasing said first locking means when said arm is pivoted to said extended position, said first cam means includes:
- a first cam mounted in a slot in said block and
- a first cam surface carried on said arm and moving through said slot; and
- said first locking means includes:
- a first shoulder on said first cam engageable with said sleeve, and
- first spring means urging first cam shoulder towards said sleeve,
- with movement of said arm from said open position to said extended position causing said first cam surface to engage said first cam and move said first cam shoulder away from said sleeve.

10. In a sliding hinge for mounting a cover on a generally rounded housing, the combination of:
- a sleeve for attachment at the interior of the housing;
- a slide block for sliding in said sleeve;
- a slide arm for attachment at the interior of the cover;
- said block and arm including interengaging pivot means for pivoting of said arm relative to said block between an extended position and an open position; and
- a first locking means carried on one of said arm and block and engageable with said housing for limiting sliding of said block when said block and arm are in said open position,
- said block and arm including first interengaging cam means for releasing said first locking means when said arm is pivoted to said extended position, said first locking means includes:
- a first cam pivotally mounted on said block and having a first shoulder engageable with said sleeve when said arm is in said open position; and
- first spring means engaging said block and first cam for urging said first cam shoulder into engagement with said sleeve;
- with said arm having a first cam surface engageable with said first cam as said arm pivots from said open position to said extended position for moving said first cam shoulder out of engagement with said sleeve, said first cam and first cam surface forming said first interengaging cam means.

11. A sliding hinge as defined in claim 10 wherein said first locking means limits sliding of said block toward said housing and including a first stop for limiting sliding of said block away from said housing.

12. A sliding hinge as defined in claim 11 including second interengaging stop means on said block and arm for defining said open position, and third interengaging stop means on said block and arm for defining said extended position.

* * * * *